No. 781,439. PATENTED JAN. 31, 1905.
G. A. MARSH.
MACHINE FOR GATHERING AND DELIVERING GLASS.
APPLICATION FILED FEB. 24, 1904.

3 SHEETS—SHEET 1.

Witnesses
Inventor.
George A. Marsh.
By Eugene W. Johnson.
Attorney.

No. 781,439. PATENTED JAN. 31, 1905.
G. A. MARSH.
MACHINE FOR GATHERING AND DELIVERING GLASS.
APPLICATION FILED FEB. 24, 1904.
3 SHEETS—SHEET 2.
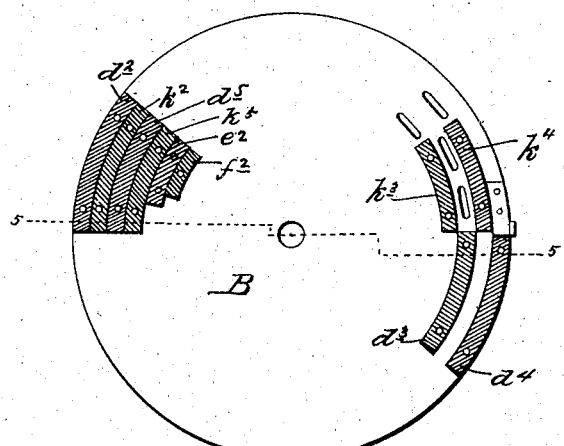
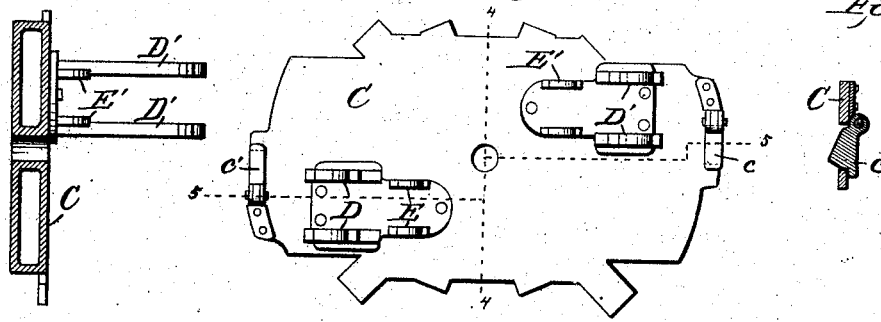
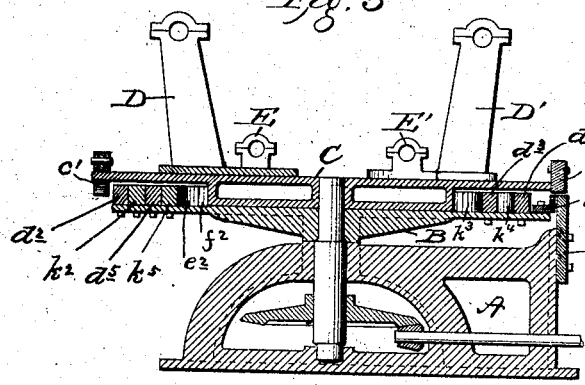
Witnesses
Inventor
George A. Marsh.
By Eugene H. Johnson, Attorney.

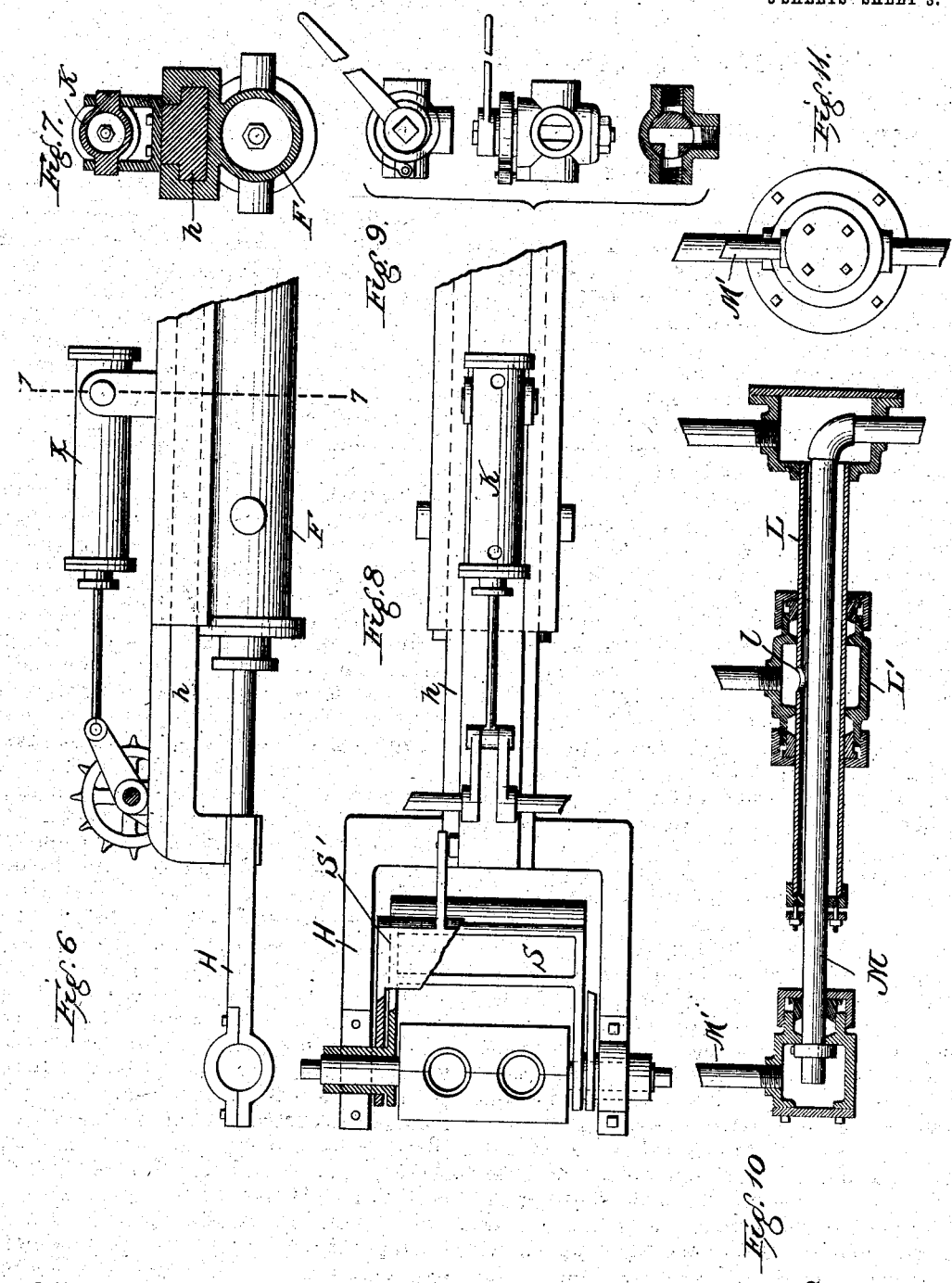

No. 781,439.       Patented January 31, 1905.

UNITED STATES PATENT OFFICE.

GEORGE A. MARSH, OF SANDUSKY, OHIO.

MACHINE FOR GATHERING AND DELIVERING GLASS.

SPECIFICATION forming part of Letters Patent No. 781,439, dated January 31, 1905.

Application filed February 24, 1904. Serial No. 195,057.

*To all whom it may concern:*

Be it known that I, GEORGE A. MARSH, a citizen of the United States, residing at Sandusky, in the county of Erie and State of Ohio, have invented a new and useful Machine for Gathering and Delivering Glass, of which the following is a specification.

My invention relates to machines or apparatus for working glass, the machine forming the subject-matter of this application being placed between a glass blowing or shaping machine and a receptacle for molten glass, the purpose of the invention being to provide means for taking glass from a receptacle and to deliver it to a machine where the glass is shaped either by blowing or pressing.

The machine as illustrated is adapted to be used in connection with gathering and shaping molds of the type shown in my applications filed February 8, 1904, Serial No. 192,596, and February 18, 1904, Serial No. 194,283, though it is within the purview of my invention to use a scoop, ladle, or a cup to take molten glass from a receptacle and place the charge gathered therein in a blowing or pressing mold.

Figure 1:
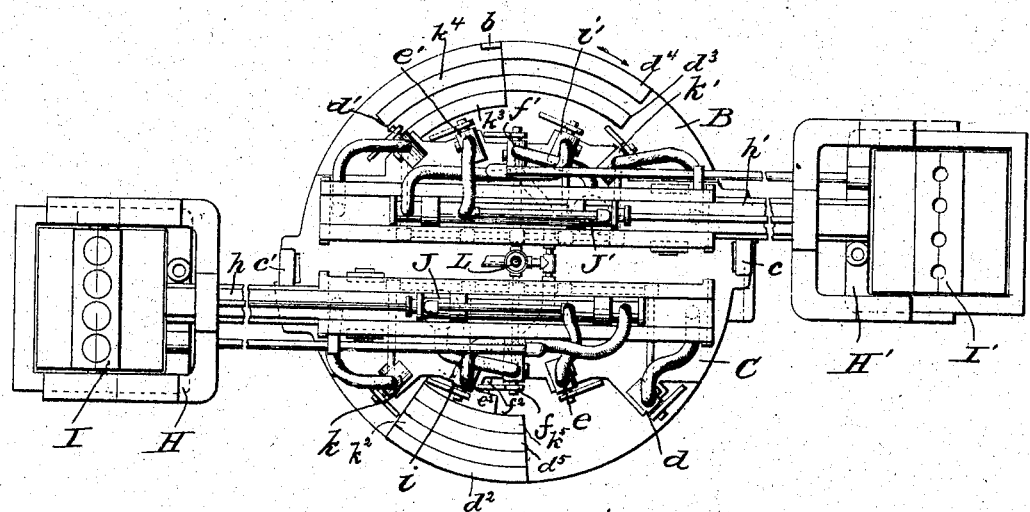
Figure 2:
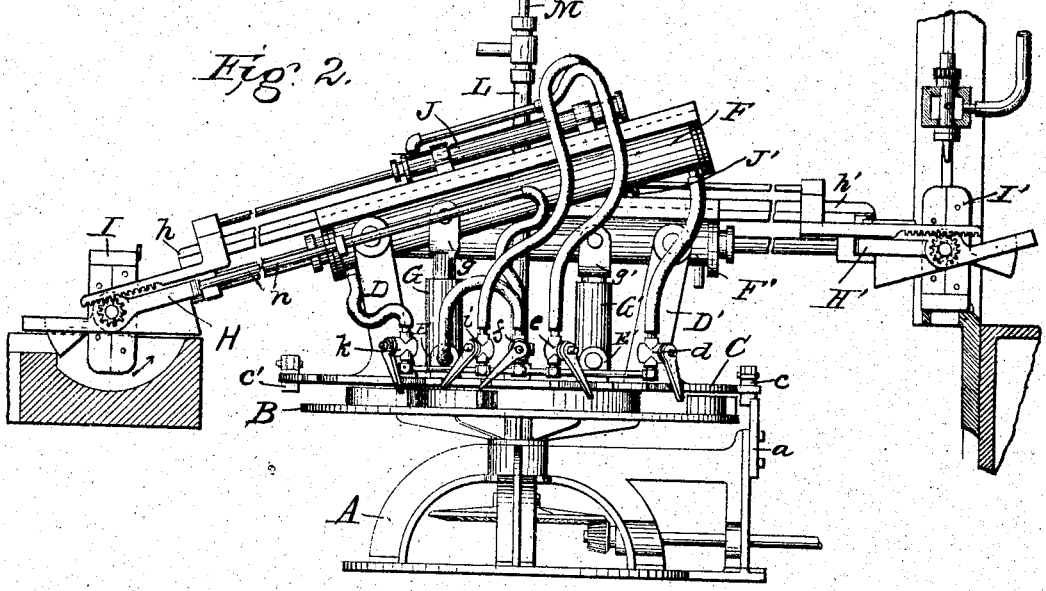

In the accompanying drawings, Figure 1 is a plan view of a glass gathering and delivering machine made in accord with my invention, the frames with their attached molds being shown projected. Fig. 2 is a side elevation showing one of the glass-gathering devices, as a mold, in the receptacle for molten glass to receive its charge, and the other mold is shown beneath the nozzles of a glass-blowing machine. Fig. 3 is a plan view of a constantly-revolving platform, showing the position of trips for operating-valves and latches. Fig. 4 is a plan view of a table which is mounted above the platform, this view showing the configuration of the table, the position of the catches carried thereby, and the supports for cylinders. Fig. 4ª is a sectional view of one of the gravitating catches carried by the table. Fig. 4ᵇ is a sectional view on the line 4 4. Fig. 5 is a vertical sectional view on the lines 5 5 of Figs. 3 and 4 and through the base. Fig. 6 is a detail view showing a part of one of the main cylinders, the sliding mold-supporting frame connected thereto, and a second cylinder for turning a mold or other glass-gathering means. Fig. 7 is a sectional view on the line 7 7. Fig. 8 is a plan view of Fig. 6 with a mold, a scoop, and a cover for the scoop mounted on the yoke of the sliding frame. Fig. 9 shows the construction of the valves. Fig. 10 is a vertical section of supply-pipes which are mounted centrally on the table, such construction being used when hydraulic and pneumatic pressure are both employed; and Fig. 11 is a plan view of the supply-pipe shown in Fig 10.

In the accompanying drawings, A refers to a suitably-constructed base with bearings for a vertical shaft, to which a rotary motion is imparted in any suitable manner, and this base has an upwardly-projecting stop-bar fixed thereon, so as to extend slightly beyond the periphery of a platform B, which is rigidly attached to the vertical shaft. The platform B has attached to its upper face a plurality of concentrically-disposed valve-trips and a marginal trip *b* to release gravitating-latches *c c'*, carried by a table C, maintained in movable engagement with the shaft. The platform B is provided about its center with a plain surface, the table C having a depending portion which rests thereon, the table and platform being maintained in frictional engagement with each other. The part of the table beyond its central depending portion overlies the concentric valve-trips. The catches *c c'* alternately engage the stop-bar *a*, attached to the base, and as the platform is turned the trip *b* thereon engages one of the catches, releasing it from the stop, so that the table and platform may revolve in unison. The arrangement and construction of the parts is such that the table C and the mechanism carried thereby make a half turn or revolution for each full revolution of the platform.

The table C carries supports D D', E E', having bearing-boxes for the trunnions of cylinders F F' and G G', the latter cylinders having pistons with yokes *g g'* to engage bosses which project from the main cylinders. The outer ends of the piston-rods for the main cylinders are connected to yokes H H', having slide-bars *h h'*, which engage guides attached to the cylinders. The piston-rods reciprocate the yokes, to which are connected molds or glass-gathering means I I'. Auxiliary cylinders J J' are carried by the slide-bars $h$ $h'$, the piston-rods of such smaller cylinders engaging and actuating means for turning the molds in the bearings of the yokes, it being desirable to turn the molds from an upright to an inverted position and back again.

The table C has at its center an upwardly-projecting hollow standard L, the upper end being closed by a suitable packing-box. The standard has an opening $l$, surrounded by a housing L', with stuffing-boxes, so that the housing may turn on the standard. Through the standard L there is passed a pipe M, the upper end entering a box from which extends a supply-pipe M'.

The construction shown in Fig. 10 provides means whereby hydraulic pressure may be supplied for operating one or more of the cylinders and air under pressure for forcing the molten glass into a mold or ladle to charge the same.

The center valves $f$ and $f'$ are double valves, inasmuch as the turning plugs are provided with two ways—one for admitting pressure to the cylinders G G', the other way communicating with a pipe for conveying air under pressure into the receptacle for molten glass to force when the receptacle is closed the charge into the glass-gathering device or mold. Pressure, either hydraulic or pneumatic, when admitted into the cylinders G G' forces the pistons thereof upward and moves the main cylinders F F' from a horizontal to an inclined position, and simultaneously air-pressure is let into one of the pipes $n$ $n'$ and passes either into a scoop or into the receptacle, in either case upon the surface of the molten glass to charge the mold. The valves which are supported by the table C are connected to branch pipes, through which either air or water under compression may pass, the construction of the valves being shown by Fig. 9, such valves being self-closing by reason of the springs and are operated by arms attached to the plugs, which arms are moved against the action of the springs by the segmental trips attached to the rotary platform B.

The ports at one end of the main cylinders are connected by flexible tubing to valves $d$ $d'$. The ports at the opposite ends of the smaller cylinders J J' are similarly connected to the valves $e$ $e'$. The double valves $f$ $f'$ communicate with ports on the trunnions of the cylinders G G' and also, through other ports in the plugs, with pipes $n$ $n'$. The valves $i$ $i'$ when opened let pressure into the smaller cylinders J J' to project the pistons thereof, and the valves $k$ $k'$ when opened admit pressure into the end of the main cylinders to retract the pistons thereof. The arms on the valves $e$ $e'$ and $i$ $i'$ are each on the same arc, being equally distant from the center of the table. The valves $f$ $f'$ are each the same distance from the center, but nearer to the center than the valves $e$ and $i$. The valves $d$, $k$, $d'$, and $k'$ are each positioned at different distances from the center to be out of line with each other and with the arms of the other valves.

The concentric trips on the platform B may be arranged substantially as shown in Fig. 3, there being ten arms for the valves and a like number of trips on the platform. The valve-arms are arranged so that five are on each side of the table, and the trips are so positioned that six will be on one side and four on the other. Both the trips on the platform and the arms on the plugs of the valves may be adjusted to advance or retard the time of contact and the movements of the parts connected therewith.

In the drawings I have shown in Fig. 1 the platform B positioned so that the trip $b$, which releases the latches $c$ $c'$ on the table from the stop $a$, will be to the rear and nearly at right angles to the mold-carrying frames, the latch $c$ being in engagement with the stop $a$. The platform B turning in the direction indicated by the arrow, the valves on the side of the table nearest the trip $b$ are open to the atmosphere, the mold at this time being on the glass-blowing machine. On the other side or front of the machine the valve-trips on the platform have passed the valve $d$, through which pressure passes to the end of the cylinder F now farthest from the mold. The valve $e$ opens the end of the cylinder J nearest to the mold to the atmosphere. The central double valve $f$ has been turned, and pressure admitted to the cylinder G rocks or oscillates the cylinder F, lowering the mold and closing the receptacle for molten glass, and when the mold has entered the receptacle air is admitted upon the surface of the glass to charge the mold. As soon as the mold is charged the arm of the double valve will have passed its trip and the main cylinder resumes its horizontal position, lifting the mold from the receptacle. The arm of the valve $i$ being engaged by a trip lets pressure into the cylinder J, projects its piston-rod, and turns the mold from an inverted to an upright position. A further movement of the platform brings one of its trips beneath the arm of the valve $k$ to retract the piston of the cylinder F and moves the mold and its supporting-frame inward. A comparatively short period before the trip $b$ engages the catch on the table a trip on the platform actuates a valve and admits pressure into the cylinder F' to retract its piston and remove the mold from the table of the blowing-machine. After both pistons have been retracted the trip $b$ engages and releases the catch from the stop $a$. The table now being unrestrained turns with the platform until the other latch engages the stop. As the platform turns the trips $d^2$ $d^3$ will engage the arms of the valves $d$ and $d'$, projecting the pistons of the cylinders F F'. The trip $e^2$ engages the arm of the valve $e$ to cause a retraction of the piston in the cylinder J to turn the mold from an upright to an inverted position. The trip $f^2$ engages the arm of the double valve $f$, oscillating the cylinder F, lowering the inverted end of the mold into the receptacle and closing the same. When the mold is lowered, the frame and wings connected therewith close the receptacle and air passes through the pipe $n$ upon the surface of the molten glass. About the time that the double valve $f$ is tripped the trips $d^2$ and $d^3$ will have passed the arms of the valves $d$ and $d'$. While the trip $f^2$ is still in engagement with the arm of the valve $f$ the trip $e^2$, which has previously actuated the valve $e$, will engage the arm of the valve $i$, admitting pressure to project the piston of the cylinder J to turn the mold I to an upright position. The trip $k^2$ actuates the arm of the valve $k$ to retract the piston-rod of the cylinder F. A considerable time after the piston in the cylinder F has been retracted the trip $k^3$ engages the arm of the valve $k'$ to effect a retraction of the piston in the cylinder F', which moves the mold I' from the blowing-machine. A further movement of the platform brings the trip $b$ under the restraining-latch $c$, and the table C turns with the platform until the opposite latch $c'$ engages the stop $a$. The table being held by the restraining-latch $c'$, the valves $d'$, $e'$, $f'$, $i'$, and $k'$ will be to the front, the mold-carrying frames being retracted. The platform turning, the trips $d^5$ and $d^4$ engage the arms of the valves $d'$ and $d$. The piston-rods of the cylinders F' and F being projected place the charged mold on the frame H on the table of the glass-blowing machine and the empty mold I' over the receptacle which contains molten glass. The platform as it turns brings the trip $e^2$ in engagement with the arm of the valve $e'$, the trip $f^2$ with the arm of the double valve $f'$, the trip $e^2$ with the arm of the valve $i'$, the trip $k^5$ with the arm of the valve $k'$ to charge the mold and bring its support to a horizontal position. After the mold has been charged and its supporting-frame brought to a horizontal position the trip $k^4$ engages the arm of the valve $k$ and the mold-supporting frame is retracted to remove the mold from the blowing-machine, after which the table makes a half-revolution to place a charged mold on the table and to charge the mold which has been removed therefrom.

In operation the mold or glass-gathering device after having been charged is placed beneath the blowing-nozzles, where it remains for a comparatively long time as compared with the movement of the mold which is being charged.

It will be noted that the platform makes one complete revolution each time that the table makes one-half of a revolution, such movements positioning the larger number of the trips on the platform to the front, where the valves and mechanism for charging the mold are.

The pipes and valves leading to the several cylinders may be connected otherwise than shown, and where a scoop is used and a plunger therefor provided the plunger can be operated either by a movement of the mechanism for turning the mold or by air admitted to a cylinder having a piston and an attached plunger.

As shown in Fig. 8, a scoop S may be provided to dip molten glass from the receptacle and carry it over the open end of the mold, after which the open end of the scoop is closed by a cover S' and air is let into the scoop to force the charge therefrom into the mold. In each case the mold has openings leading to the atmosphere to permit the escape of air from the matrices as the charge is forced into the mold.

The apparatus, with slight modification, may be used to ladle glass from a receptacle to a mold, cup, or other mold-charging device, and means may be provided for stopping the rotation of the platform when desired.

Having thus set forth my invention, what I claim as new, and desire to secure by Letters Patent, is—

1. In a machine for the purpose set forth, a rotary platform provided with concentrically-arranged valve-trips, a table in frictional engagement with the platform, glass-handling mechanism carried by the table, valves for the glass-handling mechanism actuated by the trips and means for holding the table stationary during movement of the platform.

2. In a machine for the purpose set forth, a rotary platform having thereon a plurality of trips, a table mounted to frictionally engage the platform, a latch for holding the table stationary during a partial rotation of the platform, means for releasing the latch on the completion of the partial rotation of the platform, glass-handling mechanism carried by the table and actuating means therefor controlled by valves having stems which are engaged by the trips on the platform.

3. In an apparatus of the character described, a rotary platform provided with a latch-tripping device, a table which frictionally engages the platform and carries glass-handling mechanism, the table moving with the platform during a portion of its revolution, a latch carried by the table to engage a fixed catch and hold the table against movement until released by the trip.

4. In an apparatus of the character described, a rotary platform having a latch-tripping device, a table mounted to move with the platform when unrestrained, a latch carried by the table and a stop with which the latch engages.

5. In a machine for the purpose set forth, a rotary platform, a table maintained in frictional engagement with the platform and movable therewith and means for holding the table stationary during a portion of the rotation of the platform.

6. In a machine for the purpose set forth, a rotary platform, a table movable therewith when unrestrained, means for holding the table stationary during a portion of the rotation of the platform and means for releasing the table to permit it to turn for a portion of a rotation of the platform.

7. The combination of a base or support, a rotary platform, a table mounted to frictionally engage the platform, latches carried by the table, a stop which is engaged by the latches and a trip for the latches.

8. In an apparatus for taking and delivering molten glass from a receptacle, a glass-gathering device, a support therefor and mechanism for revolving, reciprocating and tilting the support and means for turning the gathering device on the support.

9. In glass-working apparatus, the combination with a receptacle for molten glass and glass-shaping mechanism, of duplicate supports for glass-gathering devices maintained between the receptacle and the shaping mechanism, means for moving horizontally for one-half of a rotation both of the supports to place one of the glass-gathering devices on the shaping mechanism and the other one over the receptacle, means for tilting one of the supports to lower the charge-gathering device carried thereby into the receptacle and means for turning the gathering device on its support.

10. In glass-working apparatus, a base, a rotary platform having valve-trips thereon, a table having latches to engage a stop, a latch-releasing lug on the platform, cylinders maintained in oscillating engagement with the table, glass-gathering devices actuated by the piston-rods of the cylinders, pipes connected with the cylinders and with valves opened to admit pressure to the cylinders, substantially as shown and for the purpose set forth.

11. In glass-working apparatus, the combination with glass-gathering devices, of rotatable and tilting supports for the gatherers, means for arresting the rotary movement of the supports, means for tilting one of the supports and means for turning the gathering device carried thereby.

12. Glass-working apparatus comprising a rotary table, means for holding the table stationary, a cylinder carried by the table, a mold, a piston-rod for the cylinder to which the mold is connected, and means for turning the mold from an inverted to an upright position, for the purpose set forth.

13. In glass-working apparatus, mechanism for gathering glass from a receptacle comprising a rotary platform having a latch-trip and valve-trips, a table in engagement with the platform and provided with restraining means, a cylinder fulcrumed upon the table, a piston-rod for the cylinder with which the glass-gathering means is connected, means for turning the glass-gathering means on its support, and valves having arms which are engaged by the trips to admit pressure to the cylinders.

14. In a glass-working apparatus, the combination with a rotary platform, a table having an intermittent movement therewith, an oscillatory cylinder fulcrumed to a piston which enters a cylinder attached to the table, a glass-gathering mold carried by the oscillatory cylinder and its piston-rod, a cylinder provided with a piston-rod having means for turning the glass-gathering mold upon its support, and trip-valves for the ports of the cylinders which are engaged by the trips on the platform, substantially as set forth.

15. In glass-working apparatus, a gathering-mold, means for moving the mold over a receptacle containing molten glass, means for turning the gathering-mold to and from an inverted position, means for lowering the mold into the receptacle and gathering a charge of glass therein, means for turning and raising the mold and moving the same to place the mold beneath the nozzles of a blowing-machine.

16. In glass-working apparatus, a table having fulcrumed thereon cylinders, glass-gathering molds carried by the piston-rods of the cylinders, cylinders carried by the fulcrumed cylinders the piston-rods thereof having means for turning the molds on their supports, means for rocking the fulcrumed cylinders on their fulcrums, and means carried by the table and its rotary support for opening and closing the ports of the several cylinders.

In testimony whereof I have signed my name to this specification in the presence of two subscribing witnesses.

GEORGE A. MARSH.

Witnesses:
 FRANK S. APPLEMAN,
 EUGENE W. JOHNSON.